United States Patent [19]

Lotz et al.

[11] Patent Number: 5,198,178
[45] Date of Patent: Mar. 30, 1993

[54] CONTINUOUS STRAND CASTING PLANT WITH SLAB CUTTING ROLLER TABLE

[75] Inventors: Horst K. Lotz, Hofheim-Wallau, Fed. Rep. of Germany; Glyndwr Manning, Blackfordby, Great Britain

[73] Assignee: GeGa Corporation, Carnegie, Pa.

[21] Appl. No.: 599,794

[22] Filed: Oct. 18, 1990

[30] Foreign Application Priority Data

Oct. 19, 1989 [EP] European Pat. Off. ........ 89119388.0

[51] Int. Cl.$^5$ ............................................... B23K 7/00
[52] U.S. Cl. ........................................ 266/50; 266/48
[58] Field of Search .................... 266/50, 48; 148/9 R

[56] References Cited

U.S. PATENT DOCUMENTS 3,443,803  5/1969  Wernicke ............................ 266/50
4,495,000  1/1985  Möller ................................. 266/50

Primary Examiner—Scott Kastler
Attorney, Agent, or Firm—Walter J. Blenko, Jr.

[57] ABSTRACT

A continuous casting slab cutting apparatus is disclosed. The apparatus permits a slab to be cut from a strand of continuous casting using a synchronized strand cutting machine. A slab roller table having a set of slab rollers is positioned such that as the strand cutting machine passes over the moving strand, the cutting burner is never positioned over any of the slab rollers. Also disclosed is a system for containing and removing smoke and other gases generated by the cutting process from the strand cutting area. The containment system includes partitions and plates as well as ventilation ducts positioned at various areas within the cutting area.

15 Claims, 3 Drawing Sheets

CONTINUOUS STRAND CASTING PLANT WITH SLAB CUTTING ROLLER TABLE

FIELD OF THE INVENTION

The present invention relates to a continuous strand casting plant with a slab cutting roller table, particularly a continuous steel casting operation wherein a synchronized movable cutting device cuts a slab from the moving strand.

BACKGROUND OF THE INVENTION

Continuous casting in the production of steel and other metals is well known in the art.

The continuous casting operations of the prior art have not been without considerable problems, however, especially in the slab cutting area. One technique of the prior art is the use of descending rollers on the roller table. This technique has several drawbacks, however. During the cutting process slag is generated, which sticks to rollers and mechanisms used in the slab conveying operation, which eventually cuts into the rollers and mechanisms slowing, if not halting, operation. In general, this type of slab cutting operation requires complicated hydraulic lifting and lowering devices which are costly and require considerable maintenance. Additionally, this type of slab cutting technique for continuous casting requires the control of lowering rollers according to the cutting/synchronous travel progress of the cutting means being used. Furthermore, granulation of the slag in the cutting area is necessary.

A major problem of the prior art systems is the inability to adequately remove smoke and gases generated by the slab cutting process, especially in multiple strand casting plants. Furthermore, the resulting difficult visibility of the kerf surface makes it difficult for the operator to assess problems in the cutting operation and take corrective action. Also, the need for large gaps in the support mechanisms for the slab occasionally limit the minimum piece length that can be obtained. The above problems are typically found in the area including the descending rollers in the roller table.

Another known cutting method uses a roller or disc roller table with intermittent cutting (that is no cutting over the rollers or roller shafts). This type of cutting operation is likewise fraught with problems, including the tendency for slag to stick to the rollers and cut into the rollers with eventual operational failures. Often slag granulation occurs fairly close to the roller. Also, the synchronous controller for the cutting device pauses over the rollers, requiring a longer cutting area to compensate for the pause in cutting when the cutting device is positioned over the rollers. These repeated cutting starts and stops result in poor cut surface quality and present a risk of disruptions in the cutting process. Additionally, insufficient smoke removal, as previously described, especially at variable strand widths and difficult visibility of the kerf surface are common in this strand cutting method.

In another slab cutting device of the prior art, a moving roller table with or without cut interruption over the slab rollers uses a variable drive mechanism which attempts to pass the slab being cut at a faster rate when the cutting mechanism passes over a roller. This device requires complex drive mechanisms and variable distances corresponding to the location of roller supports at the entrance or exit of the roller table. Additionally, all of the disadvantages of the other prior art cutting systems are present, even if slag occurrence, increased cutting time or increased synchronous travel path are improved relative to the intermittent cutting method.

Accordingly, it would be useful in the art of continuous casting to develop a slab cutting device/roller table that alleviates or solves many or most of the aforedescribed problems of prior art systems.

SUMMARY OF THE INVENTION

The present invention comprises a continuous casting slab cutting apparatus including a strand support and conveying means and a strand cutting means operated in conjunction with the strand conveying means such that the strand cutting means, which may be for example an oxy-cutting burner, is adapted for synchronized travel and cutting of the slab with respect to the moving strand. The apparatus further includes a slab roller table which preferably has a series of slab rollers positioned such that as the strand is being cut the synchronized cutting device moves laterally with respect to the strand and the slab rollers in such a way as to miss the slab rollers which preferably extend only partially beneath the strand being cut.

In a preferred embodiment of the invention, the slab roller table includes adjustable slab rollers which may be positioned at various widths to accommodate varying strand widths.

In another embodiment of the invention, the slab roller table comprises a slab roller frame which runs parallel to the strand and includes one or more slab rollers, which slab rollers may be adjusted longitudinally and/or laterally with respect to the strand. In this embodiment, the slab rollers themselves can be moved, or may be adjusted longitudinally and/or laterally with respect to the strand. In one embodiment of the invention, the slab roller frame pivots at one end and is actuated by a shifting means positioned at the other end of the frame.

In still another embodiment of the invention, the slab roller frame is positioned in sections, there being at least two sections provided, each section being individually movable with respect to the other section.

In a preferred embodiment of the invention, the slab roller table is provided with slab rollers of different lengths, there being a set of short slab rollers proximate the end of the slab roller frame at which the strand cutting is initiated. In this embodiment, the apparatus further includes at least one relatively long slab roller extending further beneath the strand with respect to the short slab roller. In this embodiment the short roller and long roller are positioned to substantially correspond to the cutting line of the strand cutting device such that at no time is the strand cutting device positioned over a roller as it moves bi-directionally, (laterally and longitudinally) with respect to the direction of the strand motion.

In another preferred embodiment of the invention, the slab roller frame is hollow and includes at least one ventilation duct for the removal of smoke and other gases resulting from the cutting process. Preferably, the slab roller frames are of rectangular shape in cross section taken perpendicular to the direction of strand conveyance. Generally, the ventilation duct is covered with a lid that is removed during the cutting operation. Preferably, the ventilation duct lid remains closed until the strand cutting device passes over the ventilation duct, at which time an actuation mechanism opens the lid to permit the evacuation of smoke and gases from that region of the cutting area.

These and other aspects of the invention will become more readily apparent through the following detailed description of the preferred embodiments of the invention including the figures.

DETAILED DESCRIPTION OF THE INVENTION

Figure 1:
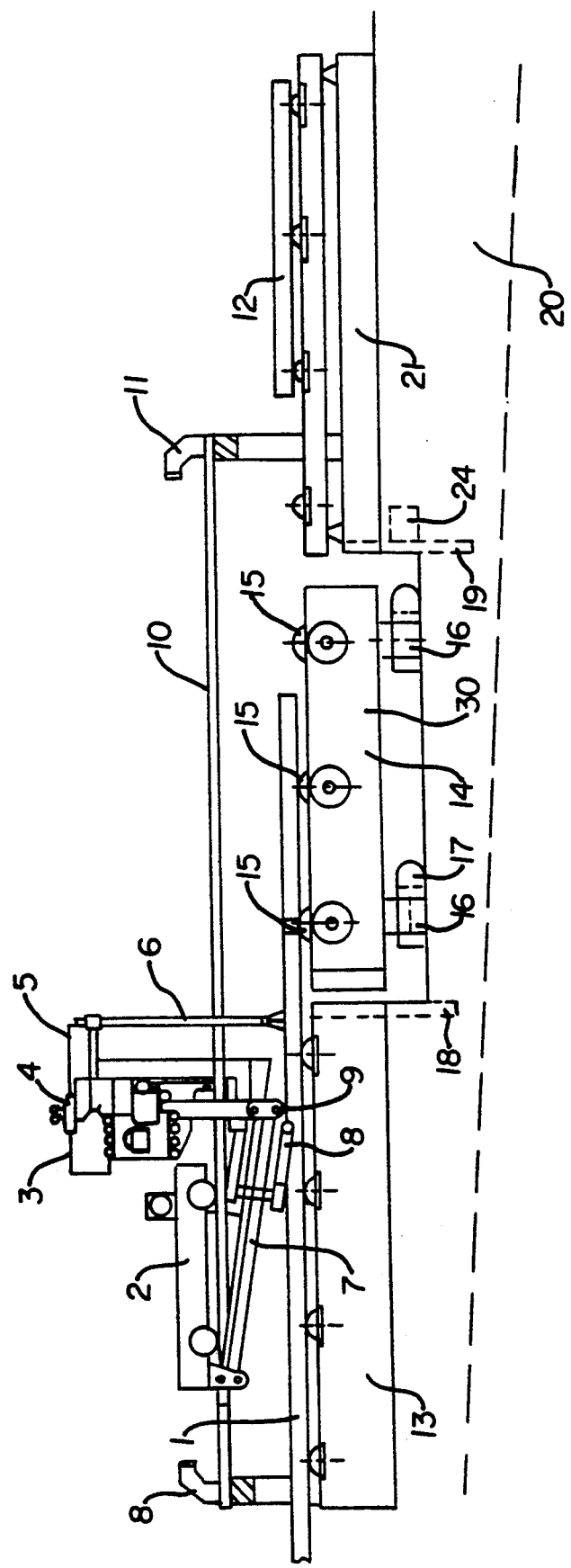
FIG. 1 illustrates a elevation view of a preferred embodiment of the present invention, specifically a section of the continuous casting operation including the strand cutting mechanism.
Figure 2:
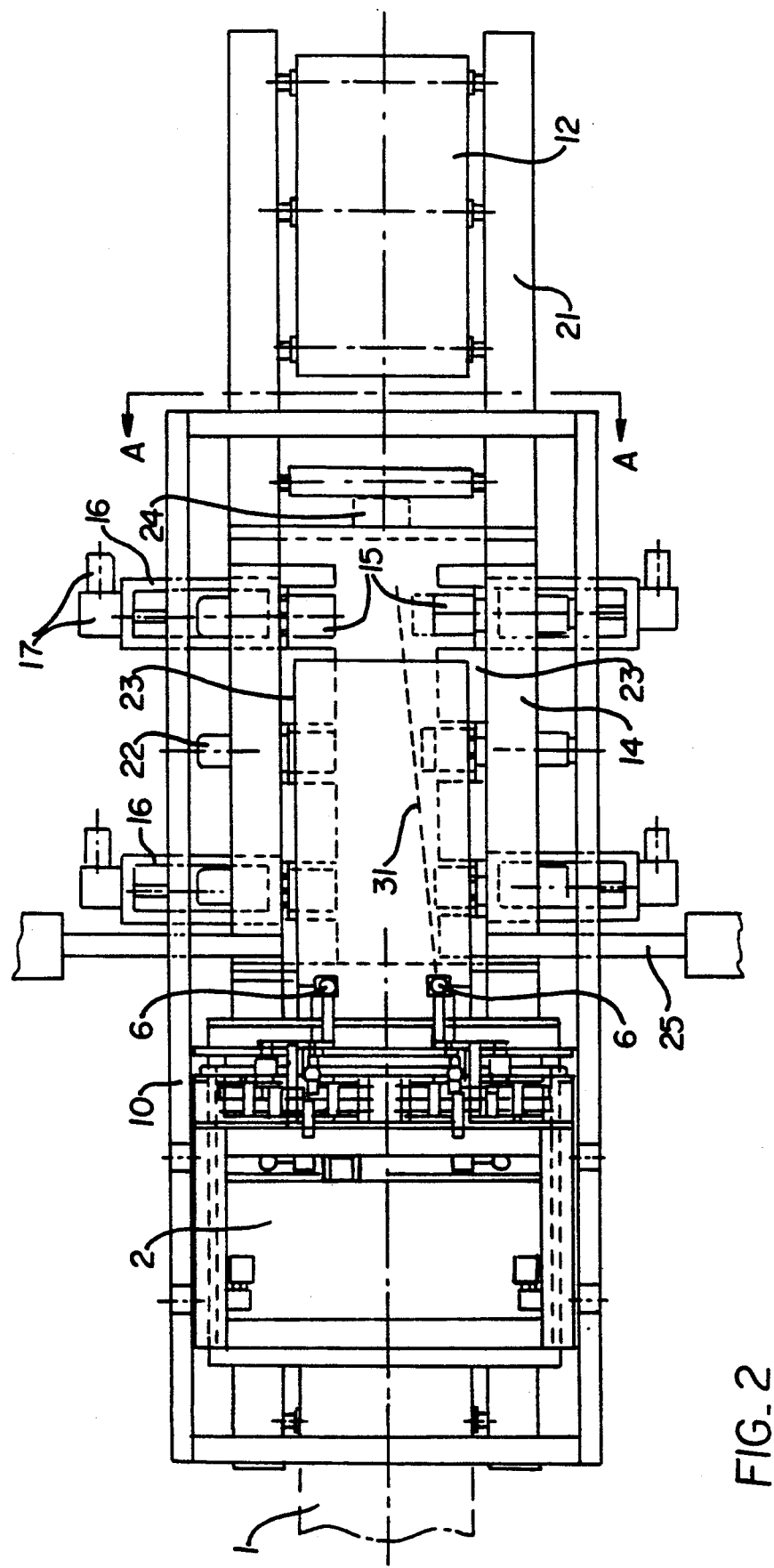
FIG. 2 illustrates a plan view of the section illustrated in FIG. 1.

As illustrated in FIGS. 1 and 2, a strand generally 1 moves beneath a cutting machine 2 having a utility supply system 3 a utility control 4 and gas pipes 5 leading to the cutting burner 6. The cutting device 2 preferably comprises a synchronized oxy-cutting machine. When an oxy-cutting burner 6 is used, a machine lever 7 actuates a sit-down skid 9, which is lowered onto the strand 1. As illustrated, strand 1 is supported by a roller table 13 at the beginning of the cutting sequence. Engagement of the sit-down skid 9 with the strand 1 begins the cutting sequence and effects the snychronized travel of the oxy-cutting machine 2 along a track 10, during which time the burner 6 cuts across the slab 1. The burners 6, as illustrated in FIG. 2, have begun cutting through the strand 1. A stop 11 prevents the cutting machine 2 from proceeding beyond the end of the track 10.

Edge feelers 8 contact the strand along its edges and initiate the cutting sequence. The cutting sequence occurs over top of a slab roller table generally 30 which consists of side frames 14, slab rollers 15, a shifting system 16 and shifting drives 17.

The slab rollers 15 preferably include a guiding collar, and are supported in the frames 14 via roller shafts which are equipped with protection sleeves and bearings. As illustrated in FIG. 2, roller drives 22 cooperate with the slab rollers 15 and are preferably positioned on the outer side of the frames 14. These drives 22, when used, turn the slab rollers 15 at a speed corresponding to casting or run-out speed of the strand. As can be readily appreciated, some or all of the slab rollers 15 can be utilized without drives.

The frames 14 rest atop shifting systems 16, consisting of slides, slide guides and shifting spindles, and being equipped with shifting drives 17 consisting of gear boxes and direct current motors. The shifting systems 16 allow the frames 14 to be adjusted to varying strand widths, which in turn allows the slab rollers 15, which do not run completely under the strand 1 to be set at various widths corresponding to the particular strand being cut. Generally, the width of the space between the slab rollers 15 is set before beginning the casting operation. The distances between the roller table 13 and slab rollers 15 and the distances between the succeeding slab rollers 15 beneath the strand 1 are selected such that strand 1 is sufficiently supported, and also such that the burners 6 simultaneously cut in synchronism with the strand 1 as the burners 6 and strand 1 move longitudinally along the slab roller table 30, without cutting into the slab rollers 15 or spraying them with slag. The cutting machine illustrated in FIG. 2 includes two cutting burners 6, which as illustrated, have partially traversed the slab 1 toward the middle thereof. After the strand 1 has been completely cut, forming slab 12, the slab 12 is taken by a run-out roller table 21 and transported onward.

The slab rollers 15 can be designed with a collar or the frames may be provided with protection or guiding plates to limit lateral movement of the strand 1 or slabs 12 thereby preventing or minimizing the tendency for strands or slabs to lie or run at an angle across the roller tables.

The slab roller table 30 may be adjusted to accommodate varying strand widths by moving the frames 14 in or out with the shifting system 16 as actuated by the shifting drive 17. In one embodiment of the invention the shifting system 16 includes a pair of shifting mechanisms and shifting drives positioned at either end of the frame 14 allowing the frame 14 to be moved in and out with respect to the strand 1. In another embodiment of the invention the frame 14 is pivotally mounted at one end having a shifting system and drive 17 mounted at the other end, permitting the frame 14 to be angularly adjusted in and out with respect to the strand 1. Thus, the smoke and/or gases generated by the strand cutting process is substantially contained within a space defined by the front and rear partition 18 and 19, the frames 14 and the cover plates 23, enabling the ventilation openings 26 to exhaust the smoke and gases from the space so defined.

The frame 14 as illustrated is comprised of only one section; however, the frame 14 may optionally comprise two or more sections, each section being individually adjustable with respect to the strand and each other section of the frame 14.

The slab rollers 15 illustrated in FIG. 2 are all of substantially the same length and run substantially the same distance below the strand 1. However, it is intended within the scope of the present invention that the slab rollers 15 may include one or more short slab rollers 15 which are positioned at the end of the frame 14 closest to the cutting burners 6 and that succeeding slab rollers 15 may extend further into the center of the strand 1, corresponding with the cutting line taken by the synchronized cutting burners 6. An example of a possible cutting path is illustrated in FIG. 2 as dotted line 31 and the slab rollers 15 are shown in phantom as they might appear if varying lengths are used in an effort to correspond to the cutting line 31.

Figure 3:
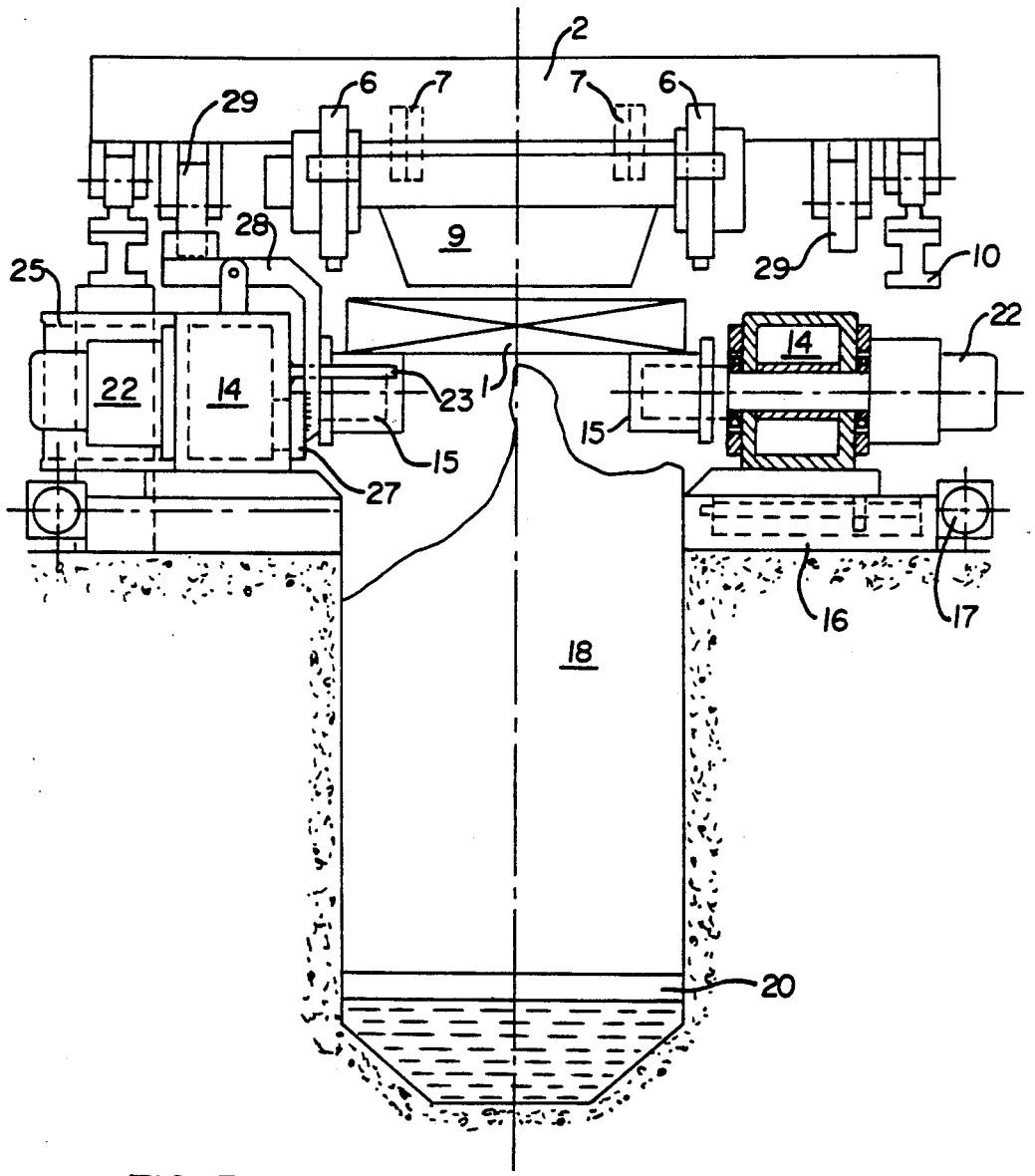
FIG. 3 illustrates an elevation view of the section illustrated in FIG. 2 taken at cross section lines AA.

As is best illustrated in FIG. 3, the frames 14 can be fabricated of hollow sections having a rectangular cross-section to effect smoke removal and exhaust of other gases produced during the cutting operation from the lower side of the strand 1 and from the cutting area generally. As seen in FIG. 2, the frames 14 preferably include a series of cover plates 23 which are positioned between the slab rollers 15 and which reach below and inside the outer edge of the strand 1. These cover plates hinder or eliminate the escape of smoke and gases passing up around the edges of the strand 1.

The frames 14 are preferably fitted with ventilation openings 26 positioned below the cover plates 23. Preferably, these ventilation openings 26 are normally covered by lids 27, which may be opened by lid levers 28 which extend through the cover plates 23. Preferably a sufficient number of ventilation openings 26 are positioned along the frame 14 and/or within the cutting area to allow effective removal of smoke and other gases from the cutting area.

The opening of the lids 27 may be initiated by the cutting machine 22 by means of a down pusher 29 which actuates the lever 28, for example at a point corresponding to the time at which the cutting burners 6 are positioned in the vicinity of the ventilation opening 26. A suck-off snorkel 25 communicates with the hollow portion of the frame 14 and preferably leads into an exhaust pipe with a shift sealing, which in turn is connected to an exhaust ventilator and/or a smoke precipitator, not shown.

The smoke and gases are for the most part generated beneath the strand 1 during the cutting operation, but tend to flow upward along the strand edges due to thermal conditions. Additionally, the smoke and gases tend to spread within the scale flume 20 and into the casting plant. In order to further control and contain the spread of smoke and gases, the present invention preferably further includes front and rear partitions 18 and 19 respectively. These partitions are preferably positioned adjacent the ends of the slab roller table 14 and extend down into the scale flume 20 as illustrated in FIGS. 1 and 3. These front and rear partitions 18 and 19 are partitioning walls which may be fabricated of steel plates, and which confine the cutting area over the scale fume 20, yet allow for the flow of water, scale and slag, which is permitted to continue to flow down the flume 20 under the lower ends of the front and rear partitions 18 and 19.

As illustrated in FIG. 1, the rear partition 19 is preferably fitted with a camera 24 which views the section of the cutting area below the strand 1 through an opening in the rear partition 19. Preferably, this opening is covered with wire mesh and glass in order to impart heat and dirt protection to the camera 24. The camera 24 permits unhampered observation of the cutting process and allows for recognition of proper cutting as indicated by slag and spark expulsion from the cutting kerf. Generally, the vertical downflow of glowing slag coupled with flying sparks indicates safe continuation of the cutting operation; a strongly rearward-directed stream of sparks indicates a cutting speed that has been preselected too high; a stream of sparks which is bent too far forward indicates that the cutting speed is too slow. The camera 24 thus allows for the recognition of the cutting process on a monitor in an operator's cabin or on the casting platform, thereby providing the operator with an opportunity to take corrective action and adjust the cutting speed if necessary.

We claim:

1. A continuous casting slab cutting apparatus comprising a strand support and conveying means and a strand cutting means operated in conjunction therewith, said strand cutting means being adapted for synchronized travel and cutting with respect to a strand being conveyed along said strand support and conveying means, frame means positioned adjacent each side of the strand, slab roller means carried by each frame means and supporting the strand along the adjacent edge as said strand is being cut by said cutting means, said cutting means being synchronized and said slab roller means being positioned such that as said strand is being cut, said cutting means avoids cutting into said slab roller means.

2. The continuous casting slab cutting apparatus of claim 1, wherein said slab roller means is adjustable to accommodate varying strand widths.

3. The apparatus of claim 2, wherein said slab roller means comprises a slab roller frame and one or more slab rollers, said slab roller frame including adjustment means enabling said slab rollers to be adjustable with respect to said strand.

4. The apparatus of claim 3, wherein said slab rollers are adjustable by virtue of said slab roller frame being adjustable with respect to said strand.

5. The apparatus of claim 3, wherein said slab rollers are adjustable by virtue of said slab roller frames being pivotally mounted at one end and being engaged with a position shifting means at the other end.

6. The apparatus of claim 3, wherein said slab roller frame comprises at least two sections, each said section being individually movable with respect to each other said section.

7. The apparatus of claim 3, wherein said slab roller means comprises at least one short slab roller proximate the end of said slab roller frame at which the cutting of said strand by said strand cutting seam is initiated, said apparatus further including at least one long slab roller extending further beneath said strand with respect to said short slab roller said short roller and said long slab roller being positioned to substantially correspond to the cutting line of said strand cutting means.

8. The apparatus of claim 3, wherein said slab roller frame is hollow and includes at least one ventilation duct for the removal of smoke or gases resulting from the cutting of said strand.

9. The apparatus of claim 8, wherein said hollow frames are rectangularly shaped in cross section taken perpendicular to the direction of conveyance of said strand.

10. The apparatus of claim 1, wherein said strand cutting means comprises an oxy-cutting burner.

11. The apparatus of claim 8, wherein said ventilation duct is covered with a lid that is removed during cutting operations.

12. The apparatus of claim 11 wherein said lid remains closed until the strand cutting means passes substantially over said ventilation duct, at which time an actuation means opens said lid.

13. The apparatus of claim 8, wherein said apparatus further includes a scale flume running below said strand and a front and rear partition positioned adjacent either end of said slab roller means, said front and rear partitions adapted to contain smoke and gases generated by the cutting of said strand within a region defined by said slab roller frame and said front and rear partitions.

14. The apparatus of claim 13, wherein said slab roller means further includes cover plates positioned between adjacent said slab rollers, said cover plates extending below said strand and inward of the edge of said strand, thereby impeding the escape of smoke or gases rising upwardly past the edges of said strand.

15. The apparatus of claim 13 further including a camera located behind said rear partition and below said strand, said camera having a field of view that includes the cutting kerf of said strand, and being protected from heat and dirt by camera protection means.

* * * * *